United States Patent
Avakian et al.

(10) Patent No.: US 9,382,415 B2
(45) Date of Patent: Jul. 5, 2016

(54) CROSSLINKABLE BIOPLASTICIZERS

(75) Inventors: Roger W. Avakian, Solon, OH (US); Ling Hu, Westlake, OH (US)

(73) Assignee: PolyOne Corporation, Avon Lake, OH (US)

( * ) Notice: Subject to any disclaimer, the term of this patent is extended or adjusted under 35 U.S.C. 154(b) by 212 days.

(21) Appl. No.: 14/234,396

(22) PCT Filed: Jul. 25, 2012

(86) PCT No.: PCT/US2012/048174
§ 371 (c)(1),
(2), (4) Date: Jan. 23, 2014

(87) PCT Pub. No.: WO2013/016444
PCT Pub. Date: Jan. 31, 2013

(65) Prior Publication Data
US 2014/0194575 A1   Jul. 10, 2014

Related U.S. Application Data

(60) Provisional application No. 61/512,330, filed on Jul. 27, 2011.

(51) Int. Cl.
| | | |
|---|---|---|
| *C08L 67/00* | (2006.01) | |
| *C08L 67/04* | (2006.01) | |
| *C08K 5/15* | (2006.01) | |
| *C08J 3/24* | (2006.01) | |
| *C08J 3/18* | (2006.01) | |
| *C08G 59/42* | (2006.01) | |
| *C08G 59/02* | (2006.01) | |
| *C08K 5/1539* | (2006.01) | |
| *C08L 63/00* | (2006.01) | |
| *C08K 5/092* | (2006.01) | |
| *C08L 91/00* | (2006.01) | |
| *C08K 5/00* | (2006.01) | |

(52) U.S. Cl.
CPC ............. *C08L 67/00* (2013.01); *C08G 59/027* (2013.01); *C08G 59/42* (2013.01); *C08J 3/18* (2013.01); *C08K 5/1539* (2013.01); *C08L 63/00* (2013.01); *C08L 67/04* (2013.01); *C08J 2327/16* (2013.01); *C08J 2367/04* (2013.01); *C08K 5/0016* (2013.01); *C08K 5/092* (2013.01); *C08L 91/00* (2013.01)

(58) Field of Classification Search
CPC ....... C08L 67/00; C08L 67/04; C08K 5/1515; C08K 5/1539; C08J 3/24; C08J 3/18; C08J 5/00; C08G 59/42; C08G 59/027
USPC .................... 525/187, 449; 528/366; 524/313
See application file for complete search history.

(56) References Cited

U.S. PATENT DOCUMENTS

| | | | | |
|---|---|---|---|---|
| 3,291,857 | A * | 12/1966 | Howerton ............. | C08F 291/00 260/998.18 |
| 3,377,304 | A | 4/1968 | Kuester et al. | |
| 5,236,987 | A * | 8/1993 | Arendt .................. | C08K 5/101 106/14.35 |
| 5,499,409 | A * | 3/1996 | St. Clair ............... | C08G 59/027 525/529 |
| 6,797,753 | B2 * | 9/2004 | Benecke ............. | C08K 5/0016 524/114 |
| 7,196,124 | B2 | 3/2007 | Parker et al. | |
| 2006/0258248 | A1 | 11/2006 | Shooshtari et al. | |

FOREIGN PATENT DOCUMENTS

| GB | 1 050 781 A | 12/1966 |
|---|---|---|
| GB | 1 371 883 A | 10/1974 |

* cited by examiner

*Primary Examiner* — Ling Choi
*Assistant Examiner* — Ronald Grinsted
(74) *Attorney, Agent, or Firm* — John H. Hornickel

(57) ABSTRACT

A crosslinkable bioplasticizer is disclosed, a mixture of an epoxy-functional bio-derived plasticizer and an aromatic dianhydride. When heated, the mixture crosslinks, which can be accelerated by the addition of a Lewis Acid metal catalyst. The crosslinked bioplasticizer can be melt compounded into a thermoplastic resin or can be formed in situ in the thermoplastic resin. The crosslinking of the bioplasticizer can reduce blooming of the bioplasticizer to the surface of a plastic article made by extrusion, molding, calendering, or thermoforming techniques.

10 Claims, No Drawings

CROSSLINKABLE BIOPLASTICIZERS

CLAIM OF PRIORITY

This application claims priority from U.S. Provisional Patent Application Ser. No. 61/512,330 filed on Jul. 27, 2011, which is incorporated by reference.

FIELD OF THE INVENTION

This invention relates to sustainable plasticizers from renewable resources which can be crosslinked.

BACKGROUND OF THE INVENTION

All industrial, construction, and consumer products strive to identify raw materials from renewable resources grown or otherwise harvested from the plant or animal kingdom. The expense and increasing scarcity of petrochemically originating raw materials only accentuate the difficulties of recycling after useful life of products made from such raw materials.

The polymer industry, which had started in the early $20^{th}$ Century with renewable resources such as natural latex for rubber goods, is now returning to such renewable raw materials whenever possible.

One body of research aims at bio-derived plasticizers. An example is U.S. Pat. No. 6,797,753 (Benecke et al.), incorporated by reference herein, which discloses plasticizers derived from vegetable oils. Another is U.S. Pat. No. 7,196,124 (Parker et al.) which discloses making elastomeric materials from castor oil and epoxidized soybean oil.

SUMMARY OF THE INVENTION

While plasticizers are often suitable for a wide variety of plasticization purposes with a wide variety of thermoplastic resins, (particularly polylactic acid (PLA) and polyvinyl chloride (PVC) from the bio-derived and petroleum-derived categories, respectively), there are situations in which the migration of plasticizer within the thermoplastic resin can cause undesired "blooming" of the plasticizer to the surface of a plastic article.

Therefore, what the art needs is crosslinkable bioplasticizers. Benecke et al. mention the use of crosslinking aids with their plasticizers from vegetable oils but do not specify which aids are suitable.

The present invention solves that problem by mixing an aromatic dianhydride with an epoxy-functional bioplasticizer, in order that such combination is capable of crosslinking upon heating, preferably in the presence of a Lewis Acid metal catalyst.

Therefore, one aspect of the present invention is a crosslinkable bioplasticizer mixture, comprising (a) an epoxy-functional bio-derived plasticizer and (b) an effective amount of an aromatic dianhydride, wherein when heated, the mixture crosslinks to form a crosslinked bioplasticizer. Preferably, the crosslinking is accelerated by the presence of a Lewis Acid metal catalyst and heat.

Another aspect of the present invention is a thermoplastic compound comprising (a) a thermoplastic resin and (b) the crosslinked bioplasticizer identified above.

Another aspect of the present invention is a method of making the crosslinked bioplasticizer identified above, comprising the steps of (a) mixing the aromatic dianhydride and the epoxy-functional bioplasticizer in a heated environment and optionally, (b) introducing an effective amount of Lewis Acid metal catalyst, wherein the aromatic dianhydride and the epoxy-functional bioplasticizer react to form the crosslinked bioplasticizer.

Features and advantages of the invention will be explained in respect of the various embodiments with reference to the following drawings.

EMBODIMENTS OF THE INVENTION

Epoxy-Functional Bioplasticizer

Any epoxy-functional bioplasticizer is a candidate for use in this invention. The extent of epoxy functionality helps determine which bioplasticizer should be used or how much crosslinking is desired in the crosslinked bioplasticizer.

U.S. Pat. No. 6,797,753 (Benecke et al.), incorporated by reference herein, recites both generically and specifically preferred epoxy-functional bioplasticizers. Generically, they can be identified as plasticizers comprising a fatty acid product derived from a vegetable oil having at least 80% by weight of unsaturated fatty acids, wherein said unsaturated fatty acids are substantially fully esterified with a monool or a polyol, and said esterified unsaturated fatty acids have been substantially fully epoxidized.

Alternatively stated, preferred epoxy-functional bioplasticizers can be identified as monoesters or multiesters of epoxidized vegetable oils.

Typically the oil has an iodine value (I.V. value), which is a measurement of the amount of double bonds in the fatty acids of the oil, that is about 100 and higher.

As Benecke et al. explain, epoxy-functional fatty acid esters can be obtained from a number of vegetable oils, such as soybean oil (I.V. value about 120-143), canola oil (I.V. value about 100-115), corn oil (I.V. value about 118-128), linseed oil (IV. value about 170-200), rapeseed oil (I.V. value about 100-115), safflower oil (I.V. value about 140-150), sunflower oil (I.V. value about 125-140), tall oil (I.V. value about 140-190), and tung oil (I.V. value about 180), and mixtures and derivatives thereof.

All of these fatty acid esters mentioned in Benecke et al. have an adequate number of unsaturated fatty acids (e.g., oleic, linolenic, linoleic) which are suitable for epoxidation, i.e., establishment of the epoxy functionality needed for bioplasticizers useful in this invention.

Preferred oils include any vegetable or plant fatty acid glyceride that is significantly unsaturated. Significantly unsaturated means that the vegetable oil typically has more than about 80 weight percent unsaturated fatty acids. Most preferably the unsaturation should be about 84 wt. % or higher.

Naturally occurring products are seldom pure and isolated. The oils used to make epoxy-functional bioplasticizers have a random mix of unsaturated fatty acids present in the vegetable oil. Also, the saturated fatty acids are likewise selected from the random mix of saturated fatty acids present in the vegetable oil. The identifying portions of saturated fatty acids present are termed saturated acyl groups that are derived from saturated fatty acids and are typified by palmitoyl, stearoyl, arachidoyl, behenoyl, myristoyl, and margaroyl.

Of the various epoxy-functional fatty acid esters, soyates are preferred with non-limiting examples of such epoxidized soyates including (i) epoxidized pentaerythritol tetrasoyate; (ii) epoxidized propylene glycol disoyate; (iii) epoxidized ethylene glycol disoyate; (iv) epoxidized methyl soyate; (v) epoxidized sucrose octasoyate; and (vi) the epoxidized product of soybean oil interesterified with linseed oil.

Of those listed, epoxidized methyl soyate (EMS) is the most commercially available as Nexo E1 brand epoxidized methyl soyate from Nexoleum Bioderivados, Ltda. Cotia, Brazil; as Vikoflex 7010 plasticizer from Arkema, Inc.; and as reFlex 100 bioplasticizer from PolyOne Corporation.

Other epoxidized alkylene monosoyates or multisoyates are less commercially available presently but will eventually become significant bioplasticizers in commerce and are predicted to be useful in this invention.

Aromatic Dianhydrides

Epoxy functionality on the bioplasticizer might be assumed to have sufficient reactivity to permit self-crosslinking of the bioplasticizer. But that was not found to be currently possible.

Therefore, another chemical is needed to participate in creation of crosslinks between and among the epoxidized fatty acid esters. Originally, an aliphatic acid, an aliphatic acid anhydride, and an aromatic acid dianhydride were considered for use in this invention. Of them, only the aromatic acid dianhydride was successful, preferably in the presence of a Lewis Acid metal catalyst.

Dianhydrides are molecules containing two acid anhydride functions. The successful aromatic acid dianhydride, also known as an aromatic dianhydride, is commonly known as pyromellitic dianhydride (PMDA) and technically known as 1,2,4,5-benzenetetracarboxylic dianhydride having CAS No. 89-32-7.

PMDA is a white or beige powder having a melting point of about 284° C., a molecular weight of 218.12, and an acid value of 1015 mg KOH/g. It is commercially available from a number of sources including Sigma-Aldrich Chemicals.

The formula of PMDA is shown below.

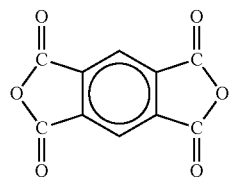

PMDA readily mixes with agitation into the epoxy-functional bioplasticizer and can even dissolve upon application of heat to the mixture.

The effective amount of PMDA can range from about 1 to about 50 parts per one hundred parts (PHR) of the bioplasticizer, desirably between 1 and 15 parts, and preferably between 5 and 15 parts. For a less densely crosslinked bioplasticizer, which also forms a more rubbery solid, less PMDA (between about 1 and about 10 parts) can be used. Between 1 part and 5 parts, at 2 or 3 or 4 parts, the amount of crosslinking and the extent of rubberiness can exhibit a smooth trend or an abrupt inflection point. But these lesser amounts of PMDA present in the mixture also slow the reaction of crosslinking. Thus, for a person having ordinary skill in the art, without undue experimentation, one can choose amidst the range of concentration of PMDA to achieve a desired result, recognizing a balance between processing efficiency and performance properties.

The invention also benefits from the relative unreactivity of the epoxy-functional bioplasticizer and aromatic dianhydride until that mixture is heated, optionally in the presence of the catalyst. Thus, it is possible to have a crosslinkable bioplasticizer which does not crosslink until a later, controlled time. Then, the crosslinking reaction between the epoxy-functional bioplasticizer and the aromatic dianhydride can occur in a manner analogous to the rubber industry where vulcanizable rubber is "green" until a subsequent curing event called vulcanization.

Optional Catalyst

A Lewis Acid metal catalyst in an effective amount, less than 5 PHR, can be used to accelerate the crosslinking reaction between the epoxy-functional bioplasticizer and the aromatic dianhydride. Any Lewis Acid metal catalyst is a candidate for use in the invention. Butyl tin tris(2-ethyl hexanoate) was used in the examples below, available as FasCat 4102 from Arkema, Inc.

Optional Additional Plasticizers

While not preferred in the present invention, it is possible that an additional plasticizer could be used in addition to the bioplasticizers identified above. For example, organic esters of various acids such as phthalic, phosphoric, adipic, sebacic, citric, and the like can be added, optionally. Specific examples of possible additional plasticizers include dioctyl phthalate, dioctyl adipate, dibutyl sebacate, and dinonyl phthalate and glyceryl stearates.

Compounds of the Bioplasticizer and Polymer Resins

Bioplasticizers of this invention are useful as functional additives in polymer resins, preferably thermoplastic polymer resins. Plasticization of polymer resins is a very well known polymer science activity, to render the plastic articles made from such compounds more flexible, fluid, pliable, soft, etc.

Any polymer resin is a candidate for plasticization by the crosslinkable bioplasticizers of this invention. Preferably, the polymer is a thermoplastic. Non-limiting examples of polymers suitable for plasticization include polyvinyl chloride (PVC), polylactic acid (PLA), poly(meth)acrylates (such as polymethylmethacrylate (PMMA)), etc.

PVC Resins

The polymer processing art is quite familiar with vinyl plastisols. The PVC resins used are typically dispersion-grade poly(vinyl chloride) (PVC) resins (homopolymers and copolymers). Exemplary dispersion-grade PVC resins are disclosed in U.S. Pat. Nos. 4,581,413; 4,693,800; 4,939,212; and 5,290,890, among many others such as those referenced in the above four patents. Any PVC resin which has been or is currently being used to make industrial goods, such as sheet flooring products, is a candidate for use in the present invention. Without undue experimentation, one skilled in the art can determine gel point, gel rate, and other gelation properties of a PVC resin in performance with a crosslinked bioplasticizer identified above.

In a similar manner, the polymer processing art is also quite familiar with solid vinyl resins, such as used to make tile flooring.

Vinyl resins useful for tile flooring comprise essentially a homopolymer with minimal amounts of less than about 5% by weight copolymerized other vinyl comonomer, but preferably little or no copolymerized other vinyl monomer. Commercial PVC resin ordinarily comprises about 56% by weight chlorine and has a Tg of about 81° C.

Preferred PVC resins are essentially homopolymers of polymerized vinyl chloride. Useful vinyl co-monomers if desired include vinyl acetate, vinyl alcohol, vinyl acetals, vinyl ethers, and vinylidene chloride. Other useful co-monomers comprise mono-ethylenically unsaturated monomers and include acrylics such as lower alkyl acrylates or methacrylates, acrylic and methacrylic acids, lower alkyl olefins, vinyl aromatics such as styrene and styrene derivatives, and vinyl esters. Useful commercial co-monomers include acrylonitrile, 2-hexyl acrylate, and vinylidene chloride. Although co-monomers are not preferred, useful PVC copolymers can contain from about 0.1% to about 5% by weight copolymerized co-monomer, if desired.

Preferred PVC resins for tile flooring are suspension polymerized vinyl chloride monomer, although mass (bulk) and dispersion polymerized polymers can be useful, but are less preferred. PVC resins can have an inherent viscosity from about 0.45 to about 1.5, preferably from about 0.5 to about 1.2, as measured by ASTM D 1243 using 0.2 grams of resin in a 100 ml of cyclohexanone at 30° C.

Vinyl plastisols for sheet flooring are typically liquid at room temperature and can be poured, pumped, sprayed or cast, depending on the formulation. These compounds can range in hardness from fishing lure plastisol with an 8 Durometer Shore A or lower, to rotocasting plastisol (mostly PVC) with a 65 Durometer Shore D and above. Advantages of vinyl plastisol in coating and sheet forming applications include ease of use and economy.

Vinyl compounds for tile flooring are nearly rigid chips or pellets and are calendered into final shape before cutting into tile sizes.

Polylactic Acid

Another thermoplastic resin benefiting from the use plasticizers is PLA. PLA is a well-known biopolymer, having the following monomeric repeating group:

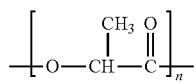

The PLA can be either poly-D-lactide, poly-L-lactide, or a combination of both. PLA is commercially available from NatureWorks, LLC located in all manufacturing regions of the world. Any grade of PLA is a candidate for use in the present invention. The number average molecular weight of PLA can be any which is currently available in a commercial grade or one which is brought to market in the future. To the extent that a current end use of a plastic article could benefit from being made from PLA, then that suitable PLA could be the starting point for constructing a compound using PLA and the crosslinkable bioplasticizer.

Other Optional Additives

A variety of ingredients commonly used in the plastics compounding industries can also be included in the compound of plastic resin and crosslinkable bioplasticizer of the present invention. Non-limiting examples of such optional additives include blowing agents, slip agents, antiblocking agents, antioxidants, ultraviolet light stabilizers, quenchers, plasticizers, mold release agents, lubricants, antistatic agents, fire retardants, frothing agents, and fillers such as glass fibers, talc, chalk, or clay.

Any conventional colorant useful in coatings and paints or plastics compounding is also acceptable for use in the present invention. Conventional colorants can be employed, including inorganic pigments such as titanium dioxide, iron oxide, chromium oxide, lead chromate, carbon black, silica, talc, china clay, metallic oxides, silicates, chromates, etc., and organic pigments, such as phthalocyanine blue, phthalocyanine green, carbazole violet, anthrapyrimidine yellow, flavanthrone yellow, isoindoline yellow, indanthrone blue, quinacridone violet, perylene reds, diazo red and others.

Table 1 shows the acceptable, desirable, and preferable ranges of amounts, in weight percents, of thermoplastic resin, crosslinkable bioplasticizer, and optional additives. All amounts are expressed in weight percents. The compounds can comprise, consist essentially of, or consist of these ingredients.

TABLE 1

| Ingredient | Formulations | | |
|---|---|---|---|
| | Acceptable | Desirable | Preferable |
| Thermoplastic Resin | 50-75 | 55-73 | 60-70 |
| Crosslinkable Plasticizer | 15-40 | 17-35 | 20-30 |
| Optional Additives | 0-25 | 5-20 | 10-15 |

Processing of the Compound

Mixing of Thermoplastic Resin and Plasticizer for Plastisol

Conventional mixing equipment is used to thoroughly mix the plastisol, either in batch or continuous operations.

Mixing in a batch process typically occurs in a low shear mixer with a prop-type blade operating at a temperature below 37° C. The mixing speeds range from 60 to 1000 rpm. The output from the mixer is a liquid dispersion ready for later coating on to a substrate to form, for example, a multi-layer laminate sheet flooring product.

Mixing of Thermoplastic Resin and Plasticizer for Solid Compound

Mixing in a batch process typically occurs in a Banbury-type internal mixer operating at a temperature high enough to fuse, or flux, the combination of PVC and plasticizer. The mixing speeds are typically above 1000 rpm in order to mechanically heat the mixture above the fusion, or flux, point. The output from the mixer is a solid compound in chips or pellets for later calendering into a single layer have a thickness useful for making, for example, tile flooring.

Controllable Crosslinking in Compounds

Because the mixture of aromatic dianhydride and epoxy-functional bioplasticizer is relatively dormant, it is possible to determine the most appropriate time for crosslinking of the bioplasticizer. That event can occur before or during melt compounding with a plastisol or a solid plastic resin.

For example, the bioplasticizer can be fully crosslinked during the making of the crosslinkable bioplasticizer by the steps of mixing, heating, and preferably adding the catalyst to form a crosslinked bioplasticizer, to be placed in inventory for later use.

Alternatively, the bioplasticizer can remain crosslinkable without heating ("green" in rubber chemistry terminology) and then crosslinked in a later event, such as melt mixing with the thermoplastic resin, whether liquidic or solid and whether in batch or continuous melt processing.

Thus, the absence of heat and the optional catalyst remaining separate from the mixture of aromatic dianhydride and epoxy-functional bioplasticizer become a timing determination by a person having ordinary skill in the art when the crosslinkable bioplasticizer should be crosslinked. The in situ crosslinking during melt compounding of the bioplasticizer and the thermoplastic resin can take advantage of the equipment and techniques used for reactive extrusion, such as the delivery of the optional catalyst at a port on the extruder downstream of the throat, in order that the crosslinkable bioplasticizer and the thermoplastic resin can thoroughly mix before crosslinking commences.

The examples below demonstrate that reaction times can vary based on the amount of aromatic dianhydride present in the bioplasticizer. A person having ordinary skill in the art of reactive extrusion will appreciate that the amount of aromatic dianhydride present determines not only final performance properties but also processing conditions, particularly when reactive extrusion is employed to crosslink the bioplasticizer.

USEFULNESS OF THE INVENTION

Advantages and usefulness of a plasticized thermoplastic compound can be achieved with a crosslinked bioplasticizer which has a much larger molecular weight as a result of the crosslinking. "Blooming" of plasticizer is less likely to occur from a bioplasticizer which is sterically hindered from migration through the thermoplastic resin because of its much larger size and conformation arising from crosslinking.

Final plastic articles can be made from compounds containing crosslinked bioplasticizers using extrusion, thermoforming, molding, calendering, and other melt-processing techniques.

Further embodiments are described in the following examples.

EXAMPLES

Table 2 shows the Comparative Examples A-D and Examples 1-5 which demonstrated the success of the invention, overcoming failures. Each Comparative Example and Example was prepared in a pre-heated cup in an oil bath having a temperature of 150° C.-160° C. Comparative Examples B and D proceeded after the 60 minutes of no reaction of Comparative Examples A and C, using the same samples, respectively.

Comparative Examples A and B showed that an aliphatic anhydride was a failure as a crosslinking agent, with or without the butyl tin catalyst.

Comparative Examples C and D showed the same failures for an aliphatic acid, with or without the butyl tin catalyst.

Because Comparative Examples B and D were using the same samples which had been heated for 60 minutes previously without catalyst present, the pre-heating and pre-mixing for one hour did not help the conditions for reaction for the additional 30 minutes, even with the catalyst present. Thus, the acid and anhydride were total failures for crosslinking capacity with the bioplasticizer.

The progression of Examples 2-5 follows a trend of decreasing content of aromatic dianhydride, from 50 parts to 5 parts. There is an inflection point in reaction duration between 15 parts and 5 parts, along with a perceptible difference in resulting form. The 5 parts Example 5 may have taken three times the reaction duration, but it also yielded a more rubber-like solid as compared to the Examples 1-4.

From this series of Examples, one having ordinary skill in the art, without undue experimentation, can tailor the amount of aromatic dianhydride used to achieve faster processing times or more flexible end products.

The invention is not limited to these embodiments. The claims follow.

What is claimed is:
1. A crosslinkable bioplasticizer mixture, comprising:
   (a) an epoxy-functional bio-derived plasticizer,

|  | Example | | | | | | | | |
|---|---|---|---|---|---|---|---|---|---|
|  | 1 | A | B | C | D | 2 | 3 | 4 | 5 |
| Ingredients (Parts) | | | | | | | | | |
| Epoxidized Methyl Soyate | 100 | 100 | 100 | 100 | 100 | 100 | 100 | 100 | 100 |
| Pyromellitic Dianhydride | 50 | | | | | 50 | 25 | 15 | 5 |
| Dodecenyl Succinic Anhydride | | | 50 | 50 | | | | | |
| Adipic Acid | | | | 50 | 50 | | | | |
| Butyl tin tris(2-ethyl hexanoate) (Arkema FasCat ™ 4102) | | | Drop* | | Drop* | Drop* | Drop* | Drop* | Drop* |
| Results | | | | | | | | | |
| Reaction Duration (minutes) | ~12 | None after 60 | None after 30** | None after 60 | None after 30*** | <1 | <1 | <1 | ~3 |
| Form | Dark Yellow Solid | Dark Brown Liquid | Dark Brown Liquid | Dark Brown Liquid | Dark Brown Liquid | Dark Yellow Solid | Yellow Solid | Yellow Solid | Yellow Rubber-Like Solid |

*Approx. 50 mg
**After 60 mins. of heating as Comparative Example A
***After 60 mins. of heating as Comparative Example C Table 2 shows in Example 1 that relative dormancy of crosslinking (about 12 minutes) for a highly loaded PMDA sample, even when heated, means that the duration of "green" crosslinkable condition is slower than economically viable but faster than unheated storage on a shelf between productions. But because the PMDA was readily disbursable into the EMS, probably even dissolving into the EMS, there is no necessity to have heated that crosslinkable bioplasticizer until minutes before the crosslinked bioplasticizer is needed.

A comparison of Examples 1 and 2 demonstrated that the presence of the butyl tin catalyst rapidly accelerates the onset and duration of crosslinking reaction, all other factors being equal.

(b) an aromatic dianhydride, present in an amount from about 1 to about 50 parts per one hundred parts of the epoxy-functional bio-derived plasticizer, and
   (c) butyl tin tris (2-ethyl hexanoate) catalyst,
   wherein the epoxy-functional bio-derived plasticizer comprises one or more monoesters or one or more multiesters of epoxidized vegetable oils or combinations thereof,
   wherein when heated, the mixture crosslinks to form a crosslinked bioplasticizer more rapidly than the mixture crosslinks without the presence of the catalyst.
2. The mixture of claim 1, wherein the epoxy-functional bio-derived plasticizer comprises a fatty acid product derived from a vegetable oil having at least 80% by weight of unsaturated fatty acids, wherein said unsaturated fatty acids are substantially fully esterified with a monool or a polyol, and said esterified unsaturated fatty acids have been substantially fully epoxidized.

3. The mixture of claim 1, wherein the epoxy-functional bio-derived plasticizer is an epoxy-functional fatty acid ester obtained from a vegetable oil selected from the group consisting of soybean oil, canola oil, corn oil, linseed oil, rapeseed oil, safflower oil, sunflower oil, tall oil, tung oil, and mixtures and derivatives thereof.

4. The mixture of claim 1, wherein the epoxy-functional bio-derived plasticizer is an epoxidized fatty acid ester of an unsaturated fatty acid selected from the group consisting of oleic, linolenic, and linoleic acids, and combinations thereof.

5. The mixture of claim 1, wherein the epoxy-functional bio-derived plasticizer is an epoxidized soyate selected from the group consisting of epoxidized pentaerythritol tetrasoyate; epoxidized propylene glycol disoyate; epoxidized ethylene glycol disoyate; epoxidized methyl soyate; epoxidized sucrose octasoyate; the epoxidized product of soybean oil interesterified with linseed oil; and combinations thereof.

6. The mixture of claim 1, wherein the aromatic anhydride is pyromellitic dianhydride.

7. A thermoplastic compound comprising (a) a thermoplastic resin and (b) the crosslinkable bioplasticizer of claim 1.

8. The compound of claim 7, wherein the thermoplastic resin is selected from the group consisting of polyvinyl chloride, polylactic acid, and poly(meth)acrylate.

9. A method of making a crosslinked bioplasticizer of claim 1, comprising the steps of:
 (a) mixing the aromatic dianhydride and the epoxy-functional bio-derived plasticizer in a heated environment and
 (b) introducing butyl tin tris (2-ethyl hexanoate) catalyst, wherein the aromatic dianhydride and the epoxy-functional bioplasticizer react to form the crosslinked bioplasticizer.

10. The method of claim 9, wherein the heated environment of step (a) is between 150° C. and 160° C.

* * * * *